2,693,406

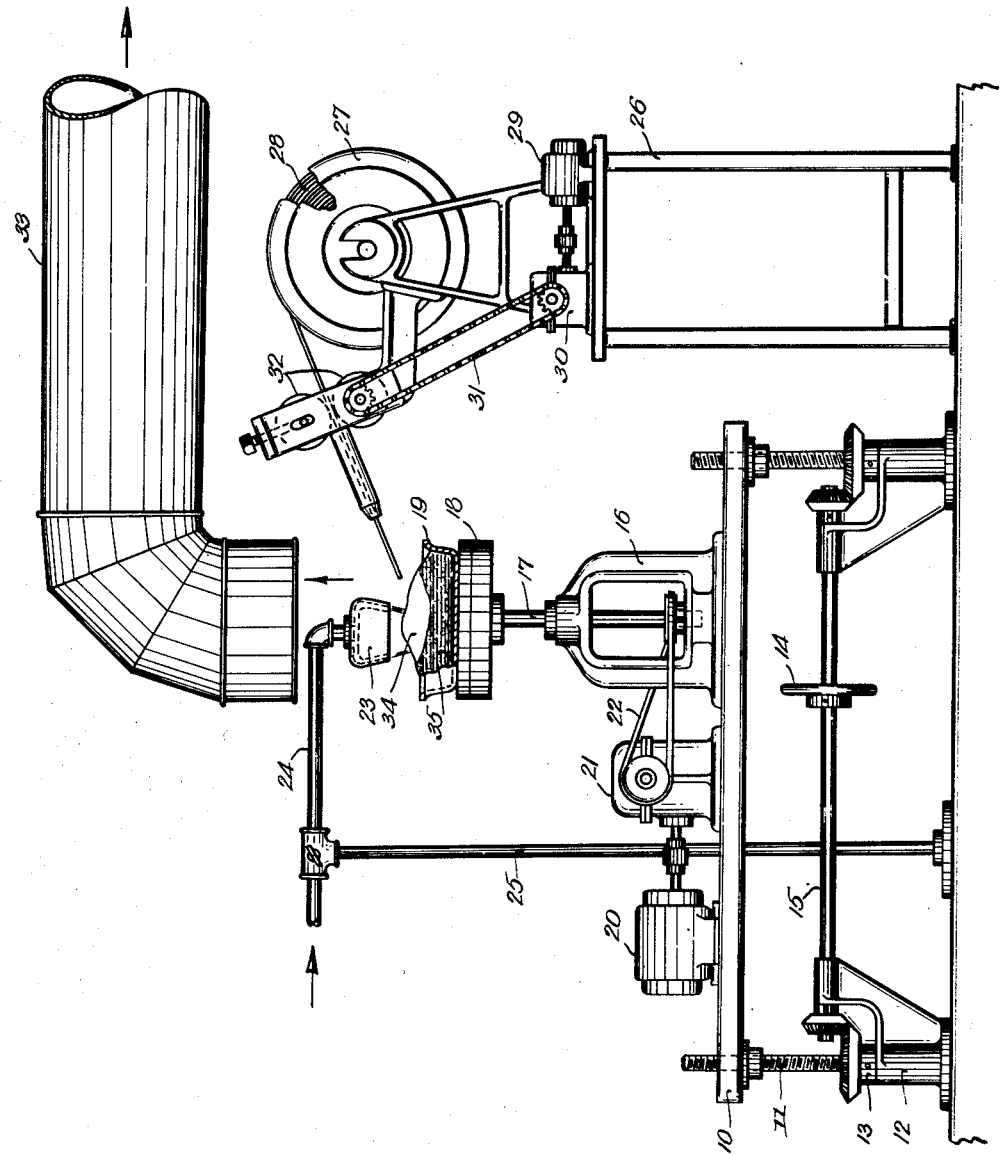

PROCESS OF MAKING ALUMINUM OXIDE

Charles B. Wendell, Jr., Needham, and George E. Engelson, Nantasket, Mass., assignors to Godfrey L. Cabot, Inc., Boston, Mass., a corporation of Massachusetts Application April 28, 1950, Serial No. 158,856

7 Claims. (Cl. 23—142)

This invention relates to processes of manufacturing aluminum oxide and comprises more particularly to a new and improved process whereby metallic aluminum may be converted directly to a fine aluminum oxide powder.

Finely divided aluminum oxide pigments are finding increasing industrial utility, for example, as reinforcing agents in rubber, as fillers in protective coatings, as abrasives and as the basic ingredient of synthetic jewels. So far as we are aware all such pigments are produced commercially at the present time by the oxidation or hydrolysis of purified aluminum salts. Such processes are expensive to operate.

Aluminum oxide pigments may also be produced by burning powdered aluminum (about minus 200 mesh in particle size) in oxygen. Such process is exceedingly dangerous to operate since slight distortion from reaction equilibrium will usually result in a violent explosion and consequent total destruction of apparatus in which carried on. Furthermore, the storage of powdered aluminum presents a considerable hazard as in this form aluminum is subject to spontaneous combustion. Consequently, the process described is not carried out on a commercial basis.

Various attempts have been made to produce aluminum oxide by oxidation of metallic aluminum but none of these attempts has been successful heretofore because aluminum when exposed to the atmosphere becomes covered immediately by a protective oxide film. This film rapidly forms on freshly exposed aluminum surfaces. Although it is of slight thickness, it is impervious in its effect. On heating the film increases in thickness and remains protective even at the melting point of the metal.

We have discovered that when a small pool of molten aluminum in a suitable heat-resistant container has concentrated upon it an exceedingly hot flame in which is present an excess of oxygen over that required for burning the combustible constituent thereof, the surface coating of aluminum oxide will be disrupted and the molten aluminum will break into flame. Thereafter the molten aluminum may be burned in a stream of oxygen-rich gas. Once the burning has commenced it will continue so long as fresh aluminum continues to be fed into the molten mass and the proper ratio of oxygen flow to aluminum feed is maintained. The exact composition of the reactive mixture is not critical: oxyacetylene or air and oxygen have been found entirely satisfactory and any equivalent mixture would serve the purpose.

Heretofore, it has been considered manifestly impossible to produce aluminum oxide from metallic aluminum which is not in powdered form. The Encyclopedia of Chemical Technology, published by the Interscience Encyclopedia, Inc., vol. 1, page 592, states that when molten aluminum is subjected to heating it forms a film of aluminum oxide which is so protective that burning will not occur.

It is an object of our invention to provide a simple and inexpensive process for the production of aluminum oxide powder directly from molten metallic aluminum.

It is a further object of our invention to provide a process whereby metallic aluminum may be converted to aluminum oxide without first subdividing the metal to a powder.

We have discovered that an excellent finely divided aluminum oxide powder can be produced by burning molten aluminum. Our novel process is characterized by one or more of certain critical steps which are necessary in order to ignite and to maintain combustion of the molten aluminum. These steps consist in directing an intensely hot flame and oxygen onto a small pool of molten aluminum contained in a heat-resistant container and, after ignition has occurred, directing a current of oxygen-rich gas into the burning aluminum to support continued combustion. So long as fresh aluminum and oxygen are continuously fed to the molten pool burning will continue, giving off a white smoke which is the aluminum oxide product in aerosol form.

Any convenient method of concentrating a hot flame and oxygen upon the small pool of aluminum will serve. We have successfully used an oxyacetylene torch adjusted to deliver an excess of oxygen over the amount necessary to burn all of the acetylene supplied.

With the full intensity of the flame concentrated upon the small target of molten aluminum metal the oxide skin is attacked externally by the flame and internally by the pressure exerted by he expanding metal and vapors as the boiling point is reached. These effects occur in rapid sequence and cause the protective skin of aluminum metal to break open and peel to the periphery of the molten mass, thereby exposing the metal, which immediately ignites and burns.

Once the aluminum metal commences to burn a stream of oxygen or gas rich in oxygen is directed into the burning mass of molten aluminum and the acetylene flame is removed. The reaction will continue without the addition of external heat so long as additional solid metal is added to the molten pool, providing the rate of addition is not so rapid as to cause the temperature of the mass of aluminum to drop below the ignition point to allow the protective skin of oxide to reform and smother the flame.

Although the limiting conditions in respect to the size of the starting charge, the intensity of the heat required to initiate the burning reaction by igniting the molten aluminum and the time required to initiate the reaction are as yet not fully determined, we have found that it is only essential that the heat applied be sufficient to raise the aluminum oxide skin at least to its melting point (2050° C.) in a relatively short period of time. Accordingly, a small starting charge facilitates rapid initiation of the burning reaction, since loss of temperature due to radiation, conduction and convection is increased in proportion to the size of the starting charge used. We have found for example, that with a single oxyacetylene hand torch a pool of aluminum about ½ inch in diameter is convenient. With that, the heat of an oxyacetylene flame rich in oxygen will initiate the reaction within a period of less than 5 minutes.

The energy of the burning reaction is sufficient to occasion a white light of high intensity to be emitted from the reaction zone. From observing this white light through an optical pyrometer, we have determined the temperature of the reaction to be in excess of 5500° F.

The product obtained in this manner is unique, that is, different in particle size and shape from aluminum oxide produced by hydrolysis or by oxidation of aluminum salts. The particles produced by the practice of our invention are uniformly spherical, have a neutral pH and are larger and are easier processing in rubber than are the aluminum oxides heretofore available.

As a secondary or by-product in our process, an extremely hard slag is formed in the container as the aluminum is burned. Apparently some of the alumina particles are thrown to the sides of the molten body and freeze with other alumina particles there and/or with some of the molten aluminum of the reaction. This material freezes out along the sides of the container and on the bottom of the container and builds up like a volcano so that eventually the pool of molten aluminum is contained in a crater of very hard refractory material. This slag has valuable refractory and abrasive properties.

These and other features and characteristics of our invention will be best understood and appreciated from the following description of a preferred manner of carrying out our novel process, in connection with the accompanying drawings which illustrate diagrammatically one form of apparatus satisfactory for carrying out the process of our invention.

The figure of the drawing is a view in elevation of the apparatus.

The illustrated apparatus comprises a table 10, adjustably mounted on supporting screws 11, projecting upwardly from standards 12. Each standard supports a threaded nut 13, and these may be rotated simultaneously to adjust the height of the table by means of a hand wheel 14 fast to a horizontal rod 15 operating the nuts 13 through beveled gear connections.

The table 10 supports an upright frame 16 in which is journalled a spindle 17 carrying at its upper end a disk 18. Upon the disk is supported a crucible 19 of graphite or other refractory material. The table 10 also supports a motor 20 acting through a reducing gear 21 and an endless belt 22 to rotate the spindle 17 and the crucible at a slow rate, for example, about 10 to 50 R. P. M. An oxygen distributing head or nozzle 23 is carried by a pipe 24 supported on a standard 25 and has connections, not shown, by which either oxygen alone or a mixture of oxygen and air may be supplied to the head 23. An adjacent stand 26 is provided upon which is mounted a reel 27 containing a coil of aluminum wire 28. The stand 26 also carries a motor 29 acting through a reducing gear 30 and a sprocket chain 31 to operate feed rollers 32 for advancing the aluminum wire to the crucible 19. The crucible itself is located directly beneath the inlet end of a hood or duct 33 by which the gaseous products of combustion are collected and brought to a bag filter or other separating device. The crucible 19 is represented as containing a crater of hard slag 35 and a pool 34 of molten aluminum.

From the foregoing description, it will be understood that a small pool of molten aluminum is first formed in the crucible 19 and this may be accomplished by directing a flame rich in oxygen upon the end of the aluminum rod or wire 28 or in any other convenient manner. The small pool of aluminum is subjected to the flame until the molten aluminum ignites and this occurs when the pure metal is exposed to the flame due to the melting of the oxide coating and at the same time the raising of the vapor pressure of the molten aluminum to such an extent that it will break through the oxide coating. The high heat capacity of the aluminum and its heat conductivity make it necessary to use a small amount of metal in starting the reaction. The use of more metal would necessitate the use of an excessive amount of oxygen and acetylene which, in turn, would create enough gas velocity to blow the metal away from the ignition point. Once a small pool of aluminum has begun to burn, its size may be increased to any desired mass by carefully feeding fresh metallic aluminum at a rate at which the heat removed by the fed metal in melting and vaporizing does not exceed the heat required for maintaining the burning reaction.

The following data taken from typical runs are illustrative of the process of our invention.

| Run No. | 1 | 2 | 3 | 4 |
|---|---|---|---|---|
| Metal (grams) | 112 | 97 | 96 | 93 |
| Metal Feed rate (grams/min.) | 7.1 | 6.1 | 6.0 | 6.8 |
| Oxygen flow (cu. ft./min.) | 0.15 | 0.15 | 0.15 | 0.23 |
| Air flow (cu. ft./min.) | 0.12 | 0.1 | 0.08 | None |
| Time of run (min.) | 15 | 15 | 15 | 13 |
| Dross or slag (grams) | 31 | 32 | 34 | 30 |
| Product (grams) | 151 | 124 | 136 | 133 |
| Collected Yield (percent of theoretical)[1] | 71 | 68 | 75 | 76 |

[1] Calculated from the equation $2Al + 1\tfrac{1}{2}O_2 \rightarrow Al_2O_3$.

The percentage of theoretical yield which is collected will vary in accordance with the efficiency of the collection equipment used. While our collection efficiency has heretofore varied between 65 and 75%, we contemplate more favorable recoveries with more elaborate recovery equipment.

The aluminum oxide produced by our novel process possesses unique characteristics. The individual particles are perfectly spherical in shape as compared to the roughly round particles of hydrolysis-formed oxide. In size they may vary from 50 to 8000 Angstrom units in diameter. An electron micrograph shows that the particles of the same general size tend to clump together. Other analytical properties include:

pH (determined in water suspension). 6.3.
Moisture at 105° C 0.64%.
Ignition loss at 1750° F 0.2%.
Surface area 12–18 m.²/gm.
Apparent density Approximately 50 lb./cu. ft.

It has been noted that aluminum oxides heretofore available can be compounded with rubber only with considerable difficulty, whereas the oxide produced by our novel process may be easily incorporated and fully dispersed in natural or synthetic rubber and resins. When compounded with rubber stock, it has the effect of producing a soft, resilient white stock of good tensile strength.

It will be readily apparent to one skilled in the art that the aluminum which is used as the raw material may be added in other forms than the wire, as described above. For example, aluminum rod, scrap aluminum or molten aluminum, etc., may be added with equally effective results, provided that contaminants are prevented from mingling with the product.

Having thus disclosed our invention and described a preferred method of carrying it out, we claim as new and desire to secure by Letters Patent:

1. The process of making aluminum oxide pigment which includes the steps of forming a pool of molten aluminum which is initially coated with a film of aluminum oxide, raising the temperature of the pool by directing an intense flame rich in oxygen thereon until the surface film breaks and the molten aluminum is exposed, then igniting and burning the exposed molten aluminum in a stream of oxygen-containing gas, and collecting from the products of combustion the aluminum oxide thus formed.

2. The process of making aluminum oxide pigment which includes the steps of forming a pool of molten aluminum which is initially coated with a surface film of aluminum oxide, directing an intense flame upon the pool until the mass is raised to incandescence and the surface film breaks and the molten aluminum is exposed, igniting and burning the exposed molten aluminum in a stream of oxygen-containing gas, continuously replenishing the pool with metallic aluminum at a rate sufficient to maintain combustion but not sufficient to extinguish the flame, and recovering the oxide thus produced.

3. The process of making aluminum oxide pigment described in claim 2 further characterized by the step of maintaining the pool of molten aluminum in a state of slow rotation.

4. A process for producing finely divided aluminum oxide which comprises the steps of concentrating a flame and a stream of oxygen on a pool of molten aluminum until the film of aluminum oxide originally coating the surface thereof is ruptured and the exposed aluminum metal bursts into flame, burning the molten aluminum in an oxygen-containing gas and recovering the aluminum oxide as a product of combustion.

5. A process for producing finely divided aluminum oxide and hard alumina refractory material which comprises the steps of forming a pool of molten aluminum in a refractory container, concentrating an external high temperature flame and a stream of oxygen, igniting the molten aluminum, discontinuing said external flame, continuously supplying a gas of substantial oxygen content and fresh aluminum to the combustion zone in proportions such that the heat generated in the combustion is sufficient to melt and burn the newly added aluminum metal, recovering the aluminum oxide produced by the combustion of the metal and accumulating a crater of solid alumina about the pool.

6. The process of making finely-divided aluminum oxide which comprises melting metallic aluminum to form a pool of molten aluminum initially coated with a film of aluminum oxide, directing upon the pool a high temperature flame rich in oxygen of sufficient heat capacity to break the film and expose the molten aluminum to the flame, igniting the molten aluminum, directing a stream of oxygen-containing gas into the burning aluminum to maintain combustion thereof, removing said high temperature flame from the combustion zone and recovering the aluminum oxide product formed from the combustion of the aluminum metal.

7. A process of making finely divided aluminum oxide which comprises concentrating a high temperature flame rich in oxygen upon a molten mass of aluminum until the film of aluminum oxide originally coating the surface thereof ruptures and the molten aluminum bursts into flame, burning the thus-exposed molten aluminum in a stream of oxygen while continuously feeding metallic aluminum into the molten mass at a rate sufficient to maintain combustion but insufficient to cool the molten mass below its ignition temperature whereby aluminum oxide is produced as a combustion product, and recovering said oxide product.

References Cited in the file of this patent

UNITED STATES PATENTS

| Number | Name | Date |
|---|---|---|
| 683,089 | Wideen | Sept. 24, 1901 |
| 721,092 | Rendall | Feb. 17, 1903 |
| 1,168,061 | Depperler | Jan. 11, 1916 |
| 1,871,792 | Horsfield | Aug. 16, 1932 |
| 1,871,793 | Horsfield | Aug. 16, 1932 |
| 2,006,891 | Hegmann | July 2, 1935 |
| 2,008,188 | Ripner | July 16, 1935 |
| 2,399,687 | McNabb | May 7, 1946 |

OTHER REFERENCES

Mellor, "Comp. Treat. on Inorg. and Theor. Chem."; vol. 5; pages 203, 204, 253 and 263, 1924; Longmans, Green and Co., N. Y.